3,600,366
BLEACHING OF POLYMALEATE HOMOPOLYMERS AND COPOLYMERS
David C. Heckert, Oxford, Ohio, assignor to The Procter & Gamble Company, Cincinnati, Ohio
No Drawing. Filed Dec. 10, 1969, Ser. No. 884,001
Int. Cl. C08f 1/88, 3/70
U.S. Cl. 260—78.4R                            9 Claims

ABSTRACT OF THE DISCLOSURE

The bleaching of polymaleate homopolymers and copolymers by the process which comprises treating a polymaleate material with chlorine dioxide in the presence of an aqueous solvent.

FIELD OF THE INVENTION

This invention relates to a process for bleaching polymaleate materials including homopolymers and copolymers thereof. More specifically, it relates to a process of bleaching polymaleate materials by a chemical method which embodies the use of chlorine dioxide. As employed hereinafter in the specification and claims, the term polymaleate is intended to include the various polymeric forms of maleic acid, maleic anhydride and water-soluble salts of maleic acid.

Polymaleate materials have become important for a number of purposes. For example, poly(maleic acid) and especially the water-soluble salts thereof, are excellent sequestering materials and are particularly adapted to use in built detergent formulations containing a detergent surfactant. In addition they are useful as textile chemicals and in the surface treatment of metals.

Satisfactory methods of preparing homopolymers of maleic anhydride have only recently been known. For example, U.S. Pat. 3,359,246 to Berry, describes the polymerization of maleic anhydride to form a high molecular weight homopolymer by reacting a melt of maleic anhydride and employing an acetyl peroxide catalyst. Similarly, U.S. Pat. 3,186,972 to Lang et al. describes the preparation of homopolymers of maleic anhydride by a process which employs the irradiation with gamma rays from a cobalt 60 source of a maleic anhydride solution in acetic anhydride. The anhydride homopolymers prepared in accordance with the above methods, for example, can conventionally be converted to their acidic form by hydrolysis employing methods known to those skilled in the art. Similarly, the alkali metal salts thereof can be conventionally prepared by merely neutralizing with a soluble alkali metal hydroxide.

Irrespective of the precise methods employed in the formation of homopolymers of maleic anhydride, such polymers have been characterized by an undesirable reddish-brown to yellow color. These undesirable color characteristics detract from the overall attractiveness and acceptability of detergent formulations containing these materials and are unattractive from a commercial standpoint. In addition, the coloration detracts from the performance of detergent formulations containing polymaleate salt builders derived from poly(maleic anhydride) materials in that they tend to precipitate as calcium salts or complexes onto the fabrics which are laundered, thereby creating an unattractive appearance.

Various attempts have been made in the art to produce polymaleates which are substantially free from objectionable color. These attempts have included the employment of carefully controlled process conditions. Known decolorization and bleaching techniques have also been employed in an attempt to minimize the color generally found in the preparation of such materials. For example, decolorization and bleaching treatments have included absorption of color by activated charcoal, Carlton's earth, fuller's earth, oxidative bleaching with hypochlorite, ozone, hydrogen peroxide, reductive treatment with sodium borohydride, sodium bisulfite, sulfur dioxide, and hydrogenation under a wide variety of conditions. Such attempts have not been satisfactory. Frequently the result has been unsatisfactory levels of bleaching, unstable or reversible bleaching or unsatisfactory processing efficiency from the standpoints of time, elevated temperatures and required amounts of bleaching agent.

Successful bleaching effects have been attained by the photochemical methods described in commonly assigned United States patent application S.N. 715,198, filed Mar. 22, 1968, now Pat. No. 3,496,150 in the name of Paul J. Kropp and entitled "Photochemical Bleaching of Polymealeate Homopolymers and Copolymers;" and in commonly assigned U.S. patent application S.N. 869,910 filed Oct. 27, 1969 in the name of David C. Heckert and entitled "Photochemical Bleaching of Polymaleate Homopolymers and Copolymers." The present invention relates to a non-photochemical method of bleaching polymaleate homopolymers and copolymers.

It is an object of the present invention to provide an efficient process for improving the color of polymaleate materials including homopolymers and copolymers thereof.

It is a further object to provide a novel process for bleaching polymaleate materials by chemical means.

It is another object to provide a novel chemical bleaching process which enables the provision of polymaleate materials adapted to use in substantially-white detergent formulations.

Other objects will become obvious from the description of the invention which hereinafter follows.

SUMMARY OF THE INVENTION

These and other objects are achieved in accordance with the present invention which comprises a process of bleaching a polymaleate homopolymer or random copolymer containing at least 45 mole percent of a maleate component selected from the group consisting of maleic anhydride, maleic acid and water-soluble salts of maleic acid which comprises treating the polymaleate homopolymer or random copolymer with chlorine dioxide in the presence of an aqueous solvent thereby to provide a polymaleate of improved color. In accordance with the present invention, a polymaleate material of improved color is obtained by preparing an aqueous solution of polymaleate, treating the solution with chlorine dioxide for a time sufficient to effect an improvement in the color characteristics of such polymaleate material and removing the polymaleate from solution.

DETAILED DESCRIPTION OF THE INVENTION

The novel chemical bleaching process of the present invention is conveniently practiced by contacting the polymaleate material with a suitable source of chlorine dioxide, hereinafter described, in the presence of an aqueous solvent. An aqueous solution of polymaleate can be contacted with gaseous chlorine dioxide or an aqueous solution thereof. Alternatively, a polymaleate material in a dry or substantially dry state can be contacted with an aqueous solution of chlorine dioxide to thereby effect an improvement in the color characteristics of the polymaleate material. In either case, the resulting polymaleate solutions are efficiently bleached to substantial whiteness and are thereby rendered more readily adapted to use in detergent compositions.

Aqueous solutions bleached as herein described contain the polymeric material in an amount by weight of from about 0.01% to about 50%. While solutions wherein the polymer is present in amounts in excess of the limit of solubility can be employed, it is preferable from the standpoint of efficiency of operation and uniformity in decolorization to employ solutions having the dissolved polymer present in an amount approximating the limit of solubility. The limit of solubility of such materials depends normally upon the molecular weight of the polymer employed and the form of polymaleate employed. Poly(maleic anhydrides) and poly(maleic acid) homopolymers prepared in accordance with conventional techniques known to those skilled in the art range in molecular weight from about 300 to possibly about 50,000. These materials bleached in water are generally employed in solutions at about the 0.01% to about 50% level, preferably at about 10% to about 20%.

The bleaching method of the invention is preferably conducted by first dissolving the poly(maleic anhydride), poly(maleic acid), water-soluble salt thereof or polymaleate copolymer in water and, thereafter, contacting the resulting solution with gaseous chlorine dioxide. When an aqueous solution of chlorine dioxide is employed, the amount of water initially employed in preparing a polymaleate solution can be proportionally reduced. It will be appreciated that when poly(maleic anhydrides) are employed and dissolved in water, substantial conversion to the corresponding poly(maleic acid) is effected. Accordingly, the polymaleate species subjected to bleaching can comprise a mixture of anhydride, acid or salt species.

The source of chlorine dioxide employed in the conduct of the process of the invention is not critical. Thus, the chlorine dioxide can be employed in a gaseous form either in a pure or substantially pure state or in admixture with an inert diluent gas. Since chlorine dioxide decomposes at concentrations over about 10%, the chlorine dioxide is preferably diluted with an inert gaseous diluent. Such dilution is preferable to the employment of the reduced pressures required to minimize the hazards involved in the employment of pure or substantially pure chlorine dioxide. Suitable diluents include air, nitrogen, chlorine, hydrogen chloride, carbon dioxide, mixtures thereof and the like. Depending upon the particular generating process employed in the manufacture of chlorine dioxide, the resulting chlorine dioxide will be admixed with one or more of the suitable diluents hereinbefore described. Chlorine dioxide prepared, for example, by reduction of sodium chlorate will normally be generated as a 2:1 by weight mixture of chlorine dioxide and chlorine gases. Variations in proportions of reactants and processing conditions will produce variations in the normal 2:1 ratio of gases. The chlorine dioxide and chlorine mixtures prepared by reduction of sodium chlorate can be employed as such or in admixture with other gases to effect suitable bleaching herein. If desired, the dioxide component can be separated by bubbling the gas mixture into water which dissolves the chlorine dioxide. The aqueous chlorine dioxide solution can be employed for polymaleate bleaching. An alternative method of separating chlorine dioxide from a mixture with chlorine involves passage of the mixture into a sodium chlorite scrubber solution which converts the chlorine gas into additional chlorine dioxide.

When the chlorine dioxide bleaching agent is used in a gaseous diluted form, the ratio of diluent to chlorine dioxide should be in the range of from about 1000:1 to about 10:1, and preferably within a range of about 50:1 to about 20:1. When employed in the form of an aqueous chlorine dioxide solution, the amount of water will normally be an amount corresponding to a ratio of water to chlorine dioxide of from about 100:1 to about 10:1.

The amount of chlorine dioxide employed in the process of the invention will be an amount sufficient to improve the color characteristics of the polymaleate material and will vary with the amount of polymaleate which is treated according to the method of the invention. The amount employed corresponds to a ratio of chlorine dioxide to polymaleate of from about 1:1000 to about 1:10 by weight. A preferred ratio is from about 1:200 to about 1:20. The requisite contact of chlorine dioxide and polymaleate, when an admixture of chlorine dioxide and diluent as hereinbefore described is employed, can be effected by contacting the polymaleate with such mixture at a widely varying flow rate. Such rate will depend upon the equipment employed, i.e. batch or continuous batch size, the desired level of bleaching and the desired bleaching time.

The chlorine dioxide bleaching agent of the invention can be prepared by conventional methods known in the art. Suitable methods include reduction of chlorates, e.g. sodium chlorate, or oxidation of chlorites, e.g. sodium chlorite. Commonly used reducing agents for the reduction of chlorates include hydrochloric acid, chromic sulfate, methanol and sulfur dioxide. Oxidation of chlorites, such as sodium chlorite, can be effected by mixing aqueous sodium chlorite solution with a strong solution of chlorine in water. The equipment required for this reaction is compact and inexpensive.

Suitable methods of preparing chlorine dioxide are described in greater detail in "Encyclopedia of Chemical Technology," Kirk and Othmer (Editors) Interscience Publishers, 2nd ed., volume 5, pp. 35–47 (1964); and in The Bleaching of Pulp, Tappi Monograph Series No. 27, W. H. Rapson, editor, pp. 130–179 (1963).

The bleaching process of the present invention can be carried out over a wide range of temperatures. For example, the reaction can be conducted at a temperature from about 0° C. to about 80° C. A preferred temperature range is from 10° C. to about 30° C. which enables the rapid attainment of desirable levels of bleaching.

Any suitable pressure can be employed, the pressure generally ranging from below atmospheric to about 10 atmospheres depending on the bleaching temperature, the concentration of polymaleate and chlorine dioxide and the like. Subatmospheric and atmospheric pressures are preferred herein from the standpoint of safety of operation. Explosion hazards are also overcome by employing chlorine dioxide gas diluted with an inert gas to a partial pressure of below one-seventh of an atmosphere and by providing explosion lids on vessels where a safe concentration might be exceeded.

The process can be conducted either batchwise or continuously, batchwise bleaching being preferred. An aqueous polymaleate solution can be introduced into a suitable reaction zone and contacted with gaseous chlorine dioxide or the polymaleate and chlorine dioxide constituents can be premixed with water and introduced into the reaction zone as a mixture or mixtures.

It is preferred that the bleaching process of the invention be conducted with agitation. This can be affected conveniently by introducing the chlorine dioxide bleaching agent, or mixture of such agent and diluent gas into a polymaleate solution with agitation provided by means of bubbling. A convenient means of effecting such agitation involves flushing the reaction vessel which generates the source of chlorine dioxide with a stream of air or other diluent gas which carries and exits the generated chlorine dioxide. The exiting mixture of chlorine dioxide and inert diluent gas is bubbled into the solution to be bleached. Suitable agitation is conveniently provided by flushing the chlorine dioxide-generating reaction vessel with the carrier gas at a flow rate of about 20 liters/hour.

Other suitable means of agitating the materials during bleaching include the use of a falling film technique or conventional mechanical stirring means.

The process of the preesnt invention is conducted for a time sufficient to effect bleaching which for purposes of the present invention refers to the attainment of improved color characteristics as well as to bleaching to substantial whiteness. While polymaleate materials are generally bleached to an improved color in about one minute to about 10 hours, and preferably in about one minute to three hours, the amount of time required to effect an improvement depends at least in part on the initial color of the sample, the concentration of the polymaleate material in solution, the relative amount and flow rate of chlorine dioxide and diluent gas employed, the temperature of treatment, the size of the sample which is treated and the like.

The decolorized or bleached polymer is removed from solution by conventional separation techniques known to those skilled in the art, as for example, by evaporation, freeze drying, filtration, coacervation or precipitation. A preferred technique is that of neutralization followed by heat or freeze-drying.

The polymaleate materials which can be bleached in accordance with the present invention include any of the poly(maleic anhydride) and poly(maleic acid) materials prepared by those methods known to those skilled in the art and colored water-soluble salts of poly(maleic acid). Preferably, the polymaleates are bleached in their anhydride and acidic forms. These forms are more readily soluble in water and provide an acidic pH in solution which is desirable in the case of chlorine dioxide bleaching. The polymaleate materials have molecular weights ranging from about 300 to about 50,000. Examples of homopolymeric polymaleates which can be bleached by the process of the present invention are described in U.S. Pat. 3,359,246 to Berry and in U.S. Pat. 3,186,972 to Lang et al. which references are incorporated herein by reference.

Homopolymeric maleic anhydride materials of U.S. Pat. 3,359,246 include those prepared by polymerizing maleic anhydride to form polymers having a molecular weight greater than about 300 by a process which comprises the steps of adding to a melt of said maleic anhydride from about 0.5% to about 8% by weight of the maleic anhydride of acetyl peroxide, maintaining the temperature from about 55° C. to about 150° C. and preferably recovering the polymer from the reaction mixture.

Especially desirable results are obtained in the above process when either or both of the following conditions are met: the acetyl peroxide is present in an amount of from about 2% to about 6% by weight of the maleic anhydride; the temperature is maintained from about 70° C. to about 130° C. Outstanding results are obtained when about 5% of the acetyl peroxide is used. The polymer obtained from the process of U.S. Pat. 3,359,246 is substantially free from non-removable impurities, both colorometric and odoriferous. Nevertheless, when dissolved in water at a 10% by weight concentration, the polymer obtained by this process is characterized by a fairly light straw color.

It is difficult to measure precisely the molecular weight of polymaleates of the type herein described and different values can be obtained depending on the method of analysis used. Cryoscopic measurements indicate the molecular weight of poly(maleic anhydride), for example, to be in the range of about 300 to 1000. Light scattering results indicate a molecular weight ranging possibly up to 50,000. However, the most accurate method for determining the molecular weight of maleic anhydride homopolymers consists of ultracentrifugal measurements. Ultracentrifugal results indicate a poly(maleic anhydride) molecular weight of from about 3,500 to about 7,000, the most probable molecular weight being 5,200±1,000. Gel filtration studies on Sephadex columns generally confirm the above-mentioned 5,200±1,000 molecular weight result.

The maleic acid anhydride homopolymers prepared according to U.S. Pat. 3,186,972 are characterized by relatively high molecular weight and are prepared by irradiating maleic anhydride in a non-solid, non-gaseous form, i.e., in liquid form or in solution, such as dissolved in a non-polymerizable liquid, with high energy ionizing radiation such as gamma rays or X-rays of an intensity of at least 10,000 rads per hour and for a total dose of from about 2 to about 60 megarads. Polymers prepared in accordance with this method are characterized by relatively high molecular weights as determined by intrinsic viscosity measurements. The materials are characterized by an intrinsic viscosity of at least 0.05 deciliter per gram or greater as determined in 2-butanone.

The hereinbefore described homopolymers of maleic anhydride are readily converted to poly(maleic acid) polymers by hydrolysis. This can be effectuated by dissolving the poly(maleic anhydride) polymer in water at room temperatures. Generally it is preferable to employ heating so as to assure complete cleavage of the anhydride bonds and formation of acidic moieties.

Metallic salts of the above described poly(maleic acids) can be prepared by neutralization with a soluble oxide or hydroxide of the desired metal. For example, alkali metal salts such as the sodium, potassium and lithium salts can be prepared by numerous acid-base conversion reactions which are well known in the art. A particularly desirable method is as follows: Dissolving poly(maleic anhydride) in water and heating at from 90° C. to about 100° C. for a period of time of approximately 0.5 hour; neutralizing the aqueous poly(maleic acid) thus obtained with an alkali solution, for example, NaOH, up to a pH of 10.0; heating on a steam bath for a period of time ranging from about 3 to about 4 hours; and readjusting the pH to about 10.0. The solid alkali metal (e.g., sodium) polymaleate may be recovered from the above solution by any of several methods such as evaporation, freeze-drying, filtration, coacervation, or precipitation. This latter method can be effectuated, for example, by pouring a concentrated aqueous solution of the polymer into rapidly sheared ethanol; the partially dried polymaleate salt thus obtained can be further dried in a vacuum oven.

Other polymaleate materials which can be bleached by the process of the present invention to provide polyelectrolyte builders especially adapted for use in detergent compositions are certain random copolymers of maleic acid, maleic anhydride or water-soluble salts thereof and comonomers wherein the polymaleate component constitutes a substantial portion of the polymeric structure. These copolymers are characterized by the presence therein of the polymaleate species in a proportion of at least 45 mole percent and are formed by randomly polymerizing the maleate monomer with a comonomer having the general formula

wherein each R is selected from the group consisting of hydrogen, methyl, carboxyl, carboxymethyl and carboxyethyl wherein only one R can be methyl. Preferred polyelectrolyte copolymers having about 50 to about 80 mole percent maleate species can likewise be readily bleached by the method of the present invention.

As employed herein the term random copolymer is intended to embrace those copolymers wherein each co-monomer is present in the polymer in both single and multiple units. Thus, copolymers of a maleate component and a comonomer wherein the maleate and comonomeric species are present in a 1:1 alternating structure are not contemplated as being within the scope of the copolymers susceptible of being bleached by the process of the present invention. Since the undesirable color which is found in maleate homopolymers is also present in maleate copolymers wherein the maleate specie or species are present in consecutively repeating units, it is an essential aspect of the present invention that the maleate copolymers of the present invention be random copolymers.

The comonomers which can be polymerized with maleic anhydride, maleic acid or an alkali metal (e.g., Na, K, Li, Ce) salt of maleic acid to form random copolymers and which can be bleached by treatment with chlorine dioxide and used as polyelectrolyte builders include, for example, ethylene, propylene, acrylic acid, methacrylic acid, itaconic acid, crotonic acid, 3-butenoic acid and 3-methyl-3-butenoic acid. Specific examples of copolymers which can be bleached by the process of the invention to provide white or near-white copolymers include a 1:1 random copolymer of propylene and maleic acid; a 1:3 random copolymer of acrylic acid and maleic anhydride; a 1:4 random copolymer of 3-butenoic acid and maleic acid; a 1:1.9 random copolymer of methacrylic acid and maleic anhydride; a 1.2:1 random copolymer of crotonic acid and maleic acid; a 1:1.5 random copolymer of ethylene and maleic anhydride; and a 1:8 random copolymer of 3-methyl-3-butenoic acid.

The random copolymers hereinbefore described which can be bleached in accordance with the process of the present invention are characterized by molecular weights ranging from about 350 to about 1,500,000. These random copolymers when treated with chlorine dioxide are characterized by a substantially white appearance and accordingly find application as polyelectrolyte builders in detergent compositions.

While the hereinbefore described polymaleate materials relate principally to homopolymers of maleic anhydride, maleic acid, and water-soluble salts of maleic acid and to random copolymers containing a substantial or predominant amount of maleate species and certain comonomer species, particularly adaptable for use as polyelectrolytes in the detergent arts, it will of course be appreciated that other copolymers having a substantial or predominant portion of maleate species adapable to use in other arts may likewise be bleached by the process of the present invention so long as the polymers are characterized by the presence of repeating maleate units.

The bleaching process of this invention proves a means of decolorizing polymaleate materials more efficiently in terms of time than conventional bleaching agents described hereinbefore. The chlorine dioxide treatment of the invention, thus, provides an effective and convenient means of decolorizing, in an aqueous vehicle, polymaleate materials which as a class are not readily decolorized by conventional means.

EXAMPLES

The following examples illustrate specific preferred embodiments of the present invention and are intended as being illustrative rather than limitative. All percentages and ratios in the following examples as well as in this specification and in the appended claims are by weight unless otherwise indicated. Temperatures are expressed in degrees centrigrade. In the following examples the prevailing temperature was 25° C. The extent of decolorization was graded on the basis of the following color scale, which for convenience may be denoted as the Berry Color Scale. In this color grading system the grade 0 is ascribed to the color which corresponds to an equivolume mixture of a 5% aqueous solution of cobaltous chloride hexahydrate and a 0.5% aqueous solution of potassium dichromate. Higher grades, X, represent an X to 1 dilution of the 0-grade solution. Thus, a 200 grade is ascribed to a solution which is a 200:1 dilution of the 0 grade solution. Similarly, a grade of 500 represents a 500:1 dilution of the 0-grade solution. The 0-grade solution, i.e., the equivolume mixture of cobaltous chloride hexahydrate and potassium dichromate solutions represents a color corresponding to dark amber or strong tea. Solutions having a 200 grade have a faint yellowish coloration barely distinguishable from plain water. A 500-grade solution has a color which corresponds virtually to water. Ten percent aqueous solutions of the lightest poly(maleic acid) polymers prepared by any process known in the art yield a color grade of about 20 to 40 which corresponds to a light straw color. As will hereinafter become apparent, polymaleates can be substantially improved in color when they are treated with chlorine dioxide. For example, polymaleate materials of a low Berry Color Grade, i.e., about 10, can be improved to about 100 in a short period of time so as to render feasible their use in detergent compositions. With further passage of time they can be rendered substantially white, this term meaning a color grade of about 200.

Example I (A) A solution of poly(maleic acid) in water was prepared as follows: poly(maleic anhydride) was dissolved in a small amount of water, heated to boiling to effect conversion to the acid form and cooled to room temperature, i.e., approximately 25° C. The solution was further diluted with water so as to obtain a solution of poly(maleic acid) in water of about 20% by weight. The poly(maleic anhydride) employed in the preparation of this solution was obtained by polymerizing maleic anhydride and five percent by weight of acetyl peroxide in benzene in accordance with U.S. Pat. 3,359,246 and was a homopolymer characterized by a molecular weight of about 4,000 to about 6,000 as determined by ultracentrifugal and gel filtration studies.

(B) A two-percent aqueous solution of chlorine dioxide was prepared as follows: concentrated sulfuric acid (36 N) was slowly dropped into a 250-ml. three-necked flask provided with a mechanical stirrer, an air-inlet and gas exit and containing a stirred solution of an equimolar mixture of sodium chloride and sodium chlorate. A 2:1 by weight of mixture of chlorine dioxide and chlorine was evolved and was exited in admixture with an air diluent by flushing the reaction vessel with a stream of air. The flow rate of air (about 20 liters/hour) was maintained at a rate sufficient to keep the concentration of chlorine dioxide in the exiting gas below three percent. The exiting mixture of chlorine dioxide, chlorine and air was passed into water to provide a two-percent chlorine dioxide solution. The chlorine component, less soluble than chlorine dioxide, was present in an amount of about 0.2%.

A five-ml. sample of the aqueous poly(maleic acid) solution was placed in a four-dram vial to which was added five ml. of the aqueous solution of chlorine dioxide. The resulting solution was stirred vigorously and allowed to stand for a one-hour period. The sample was rapidly decolorized and had attained a color grade of 75 upon the passage of 20 minutes. No further bleaching or decolorization had occured by the end of the one-hour period. An initial color grade, for purposes of comparison, was determined by mixing equivolume amounts of water and the hereinbefore described 20% by weight solution of poly(maleic acid). The initial color grade was 30.

Example II

A ten-ml. sample of a ten-percent aqueous solution poly(maleic acid), prepared as described in Part A of Example I and having a color grade of 30 on the Berry color scale, was placed in a ten-dram vial. A 2:1 mixture of chlorine dioxide and chlorine (generated by the method described in Part B of Example I) was mixed with a stream of air passing into the reaction vessel at about 20 liters/hour and was exited directly into the poly(maleic acid) solution. The exiting gas (about 3% chlorine dioxide) was generated at about the same rate as the entering stream of air and was bubbled into the polymaleate solution for a one-minute period. A total of 0.015 g. chlorine dioxide, 1.5% by weight of the poly(maleic acid), was added to the poly(maleic acid) solution.

The resulting solution was allowed to stand for a 20-minute period and was flushed with an air stream for five minutes to remove excess chlorine dioxide. The solution at this point was characterized by a color grade of 350 (essentially colorless). Removal of the aqueous solvent by evaporation or freeze drying provides a substantially white polymer.

Bleaching to a color grade of 350 was attained when Example II was repeated employing 3% chlorine dioxide by weight of the poly(maleic acid).

Example III

Ten ml. of a ten-percent aqueous solution of poly(maleic acid), prepared as described in Part A of Example I, was treated for a 30-second period with 0.007 g. of chlorine dioxide in the form of a gaseous mixture (about 3% chlorine dioxide) of chlorine dioxide, chlorine and air generated by the method described in Part B of Example I. The gaseous mixture was bubbled from the chlorine dioxide-generating reaction vessel directly into the polymaleate solution at about 20 liter/hour. The amount of chlorine dioxide added to the poly(maleic acid) solution was 1% by weight of the poly(maleic acid). Almost instantaneously with the contacting of the poly(maleic acid) solution and chlorine dioxide, a color grade of 80 was attained. Two additional minutes of exposure to the effects of the added chlorine dioxide resulted in the attainment of a color grade of 150.

Example IV

A ten-percent aqueous solution of poly(maleic acid) having a color grade of 40, prepared by melt polymerization of maleic anhydride with acetyl peroxide followed by hydrolysis, was contacted with a mixture of chlorine, chlorine dioxide and air which was bubbled into the solution as described in Example II. Bubbling of the gaseous mixture for three minutes added approximately 0.04 g. of chlorine dioxide to the poly(maleic acid) solution, 4% by weight of the poly(maleic acid). The resulting solution was allowed to stand for a 20-minute period and air was flushed through the poly(maleic acid) solution to remove excess chlorine dioxide. The resulting solution had attained a color grade of 100.

Example V

A solution containing ten-percent by weight of melt-polymerized poly(maleic acid) and having a color grade of 30 was treated for one minute as in Example II with 0.01 g. of chlorine dioxide in the form of a gaseous chlorine dioxide-chlorine and air mixture corresponding to 1% chlorine dioxide by weight of the poly(maleic acid). The resulting solution was allowed to stand for five minutes and air was passed into the solution to remove any excess chlorine dioxide. The resulting color on the Berry color scale was 90.

Example VI

To a solution of 35 g. sodium chloride (0.6 mole), 60 g. sodium chlorate (0.6 mole) and 200 ml. water in a 500 ml. three-necked vessel, as described in Part B of Example I, was added dropwise 15 ml. of 12 N sulfuric acid. A chlorine-chlorine dioxide mixture was evolved and was carried by means of a nitrogen stream through a solution of sodium chlorite to convert the chlorine component of the mixture into chlorine dioxide. The chlorine dioxide, a total of approximately 7 g., was passed for about 30 minutes into a solution of 140 g. of poly(maleic acid) in 400 ml. of water corresponding to 5% chlorine dioxide by weight of poly(maleic acid). The solution, which prior to chlorine dioxide treatment was characterized by an opaque black color, was bleached to a clear pale-yellow color after standing for 30 minutes. Continued chlorine dioxide treatment effects bleaching to substantial whiteness.

Example VII

To 75 ml. of water is added 10 grams of a 0.7:1 random copolymer of methacrylic acid and maleic anhydride having a molecular weight of about 4000 to 6000. A 2:1 mixture of chlorine dioxide and chlorine, generated in the manner described in Example II, is bubbled with admixed nitrogen gas into the solution of polymer which prior to treatment has a reddish-brown color. The gaseous mixture is bubbled into the polymer solution by passing a nitrogen stream (40 liters/hr. into the chlorine dioxide-generating reaction vessel and passing the exiting gaseous mixture into the polymaleate solution. About 3% chlorine dioxide by weight of the polymaleate is passed into the polymaleate solution over a ten-minute period. An essentially colorless solution is produced. Upon evaporation of the water solvent, a near-white copolymer is obtained.

Substantially similar results are obtained when the following copolymers are bleached in the above manner in lieu of the 0.7:1 copolymer of methacrylic acid and maleic anhydride: a 1:1 random copolymer of acrylic acid and maleic anhydride; a 1:4 random copolymer of 3-butenoic acid and maleic acid; a 1:1.9 random copolymer of methacrylic acid and a maleic anhydride; a 1.2:1 random copolymer of crotonic acid and maleic acid; a 1:1.5 random copolymer of ethylene and maleic anhydride; and a 1:8 random copolymer of 3-methyl-3-butenoic acid.

Substantially similar results are obtained when air, oxygen, carbon dioxide, hydrogen chloride or mixtures thereof are employed in place of nitrogen as a diluent carrier gas.

For purposes of comparison with the bleaching effects of chlorine dioxide of the following additional runs describing the effects of conventional hydrogen peroxide and chlorine bleachants in poly(maleic acid) solutions are described. Runs I and II are termed runs rather than examples as they are not illustrative of the claimed invention.

Run I.—Ten ml. of a ten-percent aqueous solution of poly(maleic acid), prepared as described in Part A of Example I, was placed in a ten-dram vial. Commercial grade chlorine gas was bubbled into the solution by means of a micropipette at a rate of one millimole/minute for 30 minutes, adding thereby a total of 0.2 g. of chlorine or 20% chlorine by weight of the poly(maleic acid). After 30 minutes a color grade of 100 by the Berry color scale had been attained. Upon standing for an additional 12-hour period, the solution reverted to a deep-yellow color corresponding to a color grade of 20.

Run II.—To ten ml. of a ten-percent aqueous solution of poly(maleic acid), prepared as in Part A of Example I, was added 0.06 ml. of a 30% aqueous solution of hydrogen peroxide. The sample, having an initial color grade of 40, was bleached to a color grade of 45 upon contact with the hydrogen peroxide for one hour. Contact for an additional three-hour period at 25° C. produced no further discernible bleaching effects.

As is readily apparent from the examples of the invention, the bleaching effects of chlorine dioxide is in marked contrast to the effects produced, for example, by chlorine or hydrogen peroxide. Polymaleates treated in accordance with the invention are markedly improved in color and thereby rendered more adaptable to employment in detergent compositions.

What is claimed is:

1. The process of bleaching a polymaleate homopolymer or random copolymer containing at least 45 mole percent of a maleate component selected from the group consisting of a maleic anhydride, maleic acid and water-soluble salts of maleic acid which comprises treating the polymaleate homopolymer or random copolymer with chlorine dioxide in the presence of an aqueous solvent to provide a polymaleate of improved color.

2. The process of claim 1 wherein the amount of chlorine dioxide employed is an amount in a ratio of chlorine dioxide to polymaleate of from about 1:1000 to about 1:10.

3. The process of claim 2 wherein the ratio is from about 1:200 to about 1:20.

4. The process of claim 3 wherein the polymaleate homopolymer or random copolymer is present in aqueous solution in an amount of from about 0.01% to about 50%.

5. The process of claim 4 wherein the chlorine dioxide is employed as a mixture of an inert gaseous diluent and chlorine dioxide in a ratio of inert gaseous diluent to chlorine dioxide of from about 1000:1 to about 10:1.

6. The process of claim 5 wherein the ratio is from about 50:1 to about 20:1.

7. The process of claim 6 wherein the polymaleate treated with chlorine dioxide is a homopolymer of maleic anhydride having a molecular weight of from about 300 to about 50,000.

8. The process of claim 7 wherein the homopolymer of maleic anhydride has a molecular weight of from about 3500 to about 7000.

9. The process of claim 8 wherein the polymaleate is removed from aqueous solution.

References Cited

UNITED STATES PATENTS 3,496,150   2/1970   Kropp _____ 260—78.4

JOSEPH L. SCHOFER, Primary Examiner

J. KIGHT III, Assistant Examiner

U.S. Cl. X.R.

260—78.5T; 8—109